United States Patent
Isoyama

(10) Patent No.: US 7,286,178 B2
(45) Date of Patent: Oct. 23, 2007

(54) DIGITAL CAMERA HAVING INCLINATION SENSOR

(75) Inventor: Tomoya Isoyama, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 737 days.

(21) Appl. No.: 10/254,837

(22) Filed: Sep. 26, 2002

(65) Prior Publication Data

US 2003/0063200 A1    Apr. 3, 2003

(30) Foreign Application Priority Data

Sep. 28, 2001   (JP)   ............... 2001-302652

(51) Int. Cl.
H04N 5/222    (2006.01)
H04N 5/225    (2006.01)

(52) U.S. Cl. .................. 348/333.02; 348/333.11; 348/374

(58) Field of Classification Search .......... 348/333.02, 348/371, 333.11, 333.1, 222.1, 374, 375
See application file for complete search history.

(56) References Cited

U.S. PATENT DOCUMENTS

| | | | | |
|---|---|---|---|---|
| 5,625,848 | A * | 4/1997 | Imanari | 396/50 |
| 5,640,627 | A * | 6/1997 | Nakano et al. | 396/296 |
| 6,262,769 | B1 * | 7/2001 | Anderson et al. | 348/333.1 |
| 6,563,535 | B1 * | 5/2003 | Anderson | 348/231.2 |
| 2001/0007469 | A1 * | 7/2001 | Fuchimukai et al. | 348/208 |
| 2003/0052985 | A1 * | 3/2003 | Oya et al. | 348/333.02 |

FOREIGN PATENT DOCUMENTS

| | | | |
|---|---|---|---|
| JP | 04294208 A | * | 10/1992 |
| JP | 06307865 A | * | 11/1994 |
| JP | 9-102893 | | 4/1997 |
| JP | 11-98406 | | 4/1999 |
| JP | 11-341416 | | 12/1999 |
| JP | 2000-184263 | | 6/2000 |
| JP | 2001-189879 | | 7/2001 |
| JP | 2003-60940 | | 2/2003 |

* cited by examiner

Primary Examiner—Lin Ye
(74) Attorney, Agent, or Firm—Westerman, Hattori, Daniels & Adrian, LLP.

(57) ABSTRACT

A digital camera includes an inclination sensor for detecting an inclination in a rotating direction around an optical axis. When a shutter button is half-depressed, a character signal corresponding to a detection result of the inclination sensor is generated by a character generator, and a character based on the character signal is displayed on a monitor. When the shutter button is full-depressed, an image photographed in response to the full depressing and detection result information of the inclination sensor at a time of the full depressing are recorded onto a memory card. An image reproduced from the memory card is displayed in a manner corresponding to the detection result information relating to the image.

10 Claims, 10 Drawing Sheets

FIG. 2
(A)
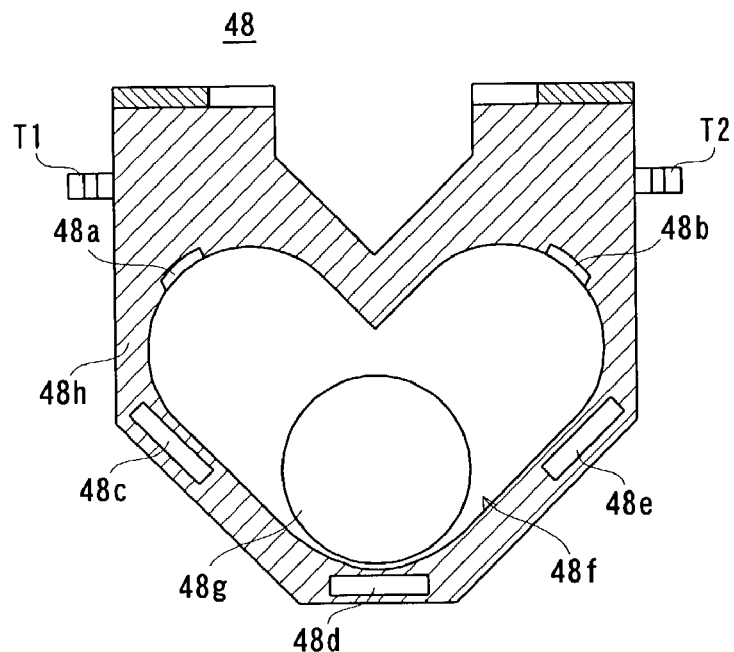
(B)
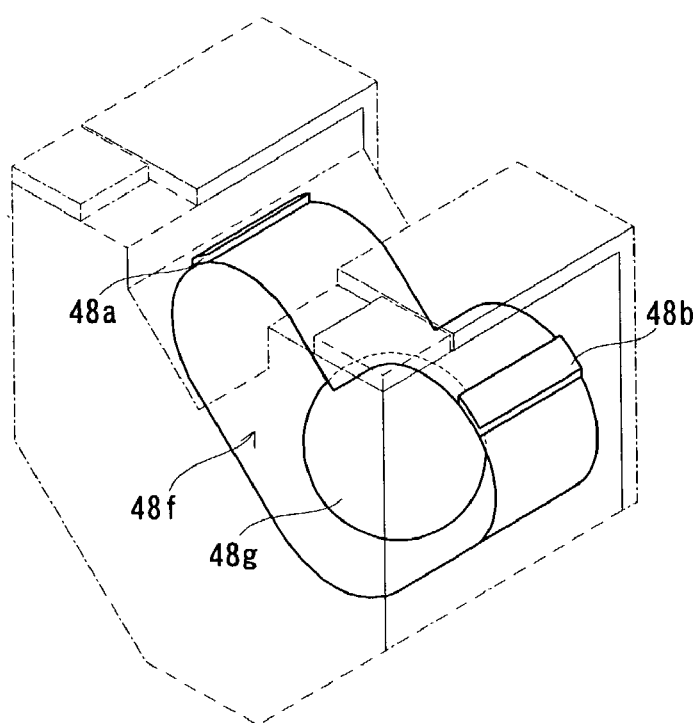

FIG. 4
(A)
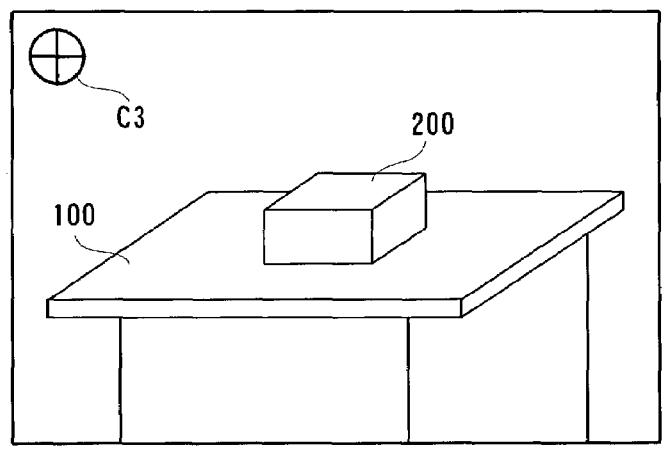
(B)
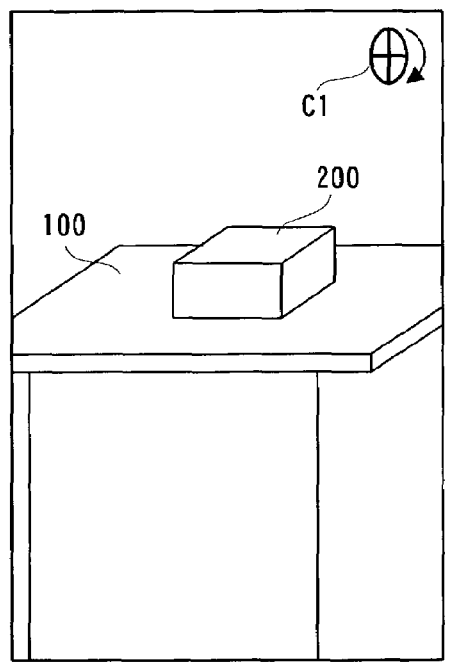
(C)
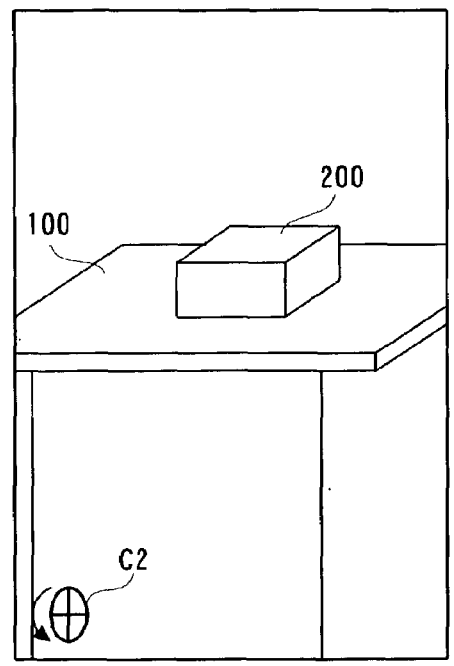

FIG. 5
(A)
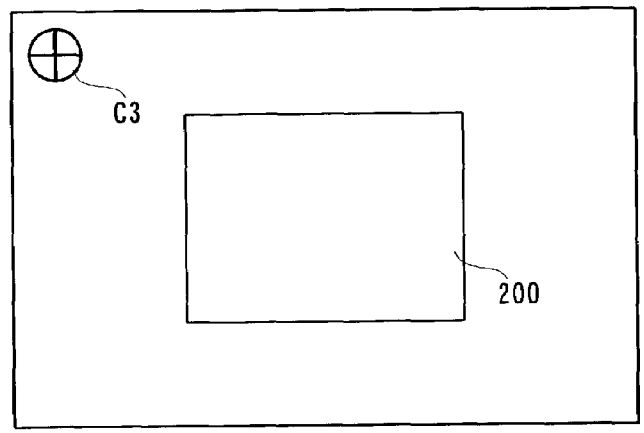
(B)
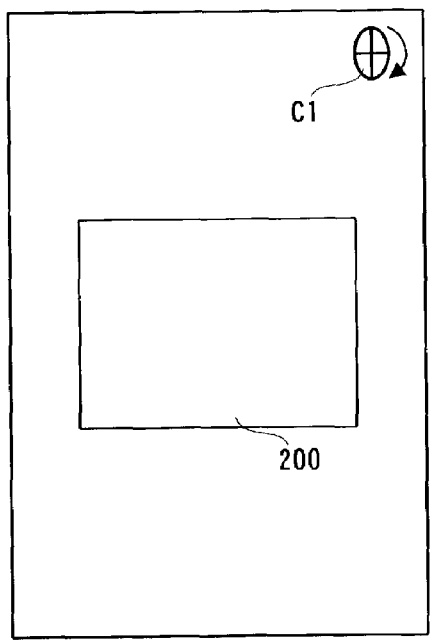
(C)
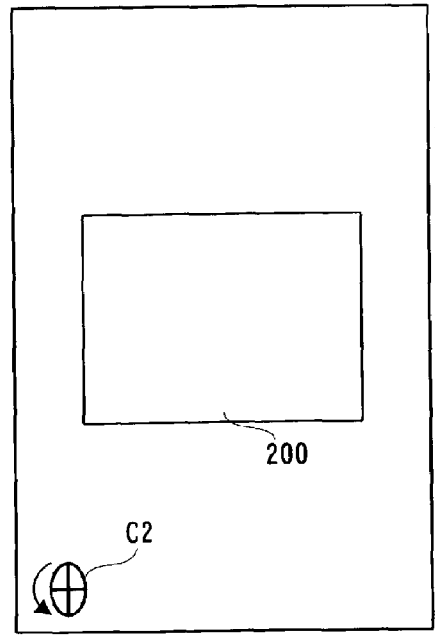

FIG. 6
(A)
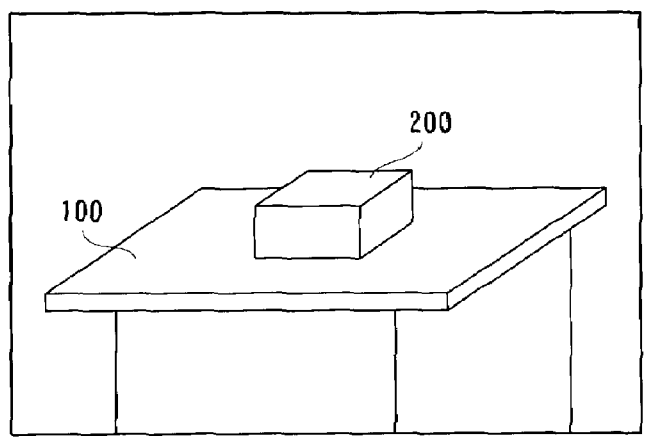
(B)
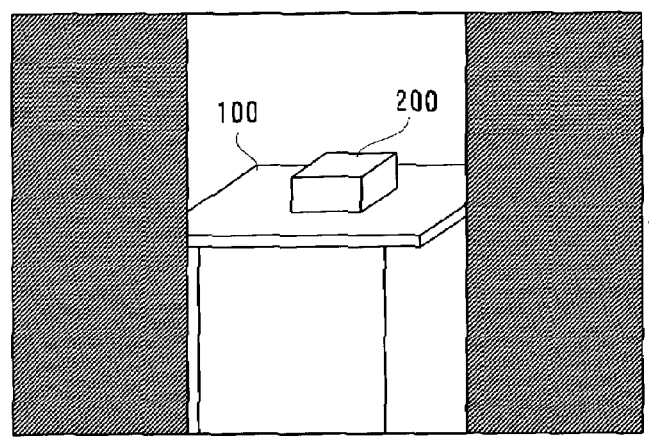
(C)
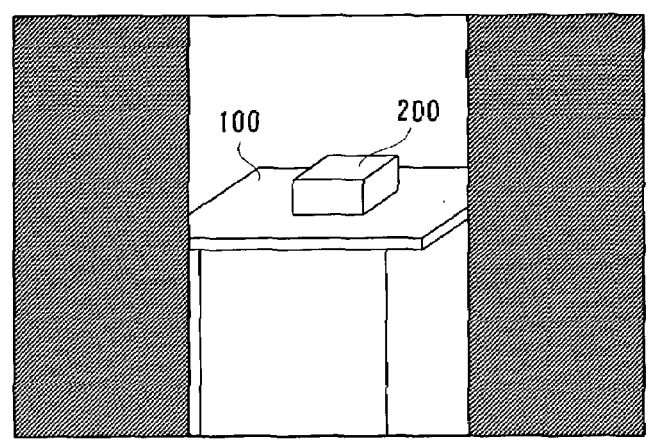

FIG. 7
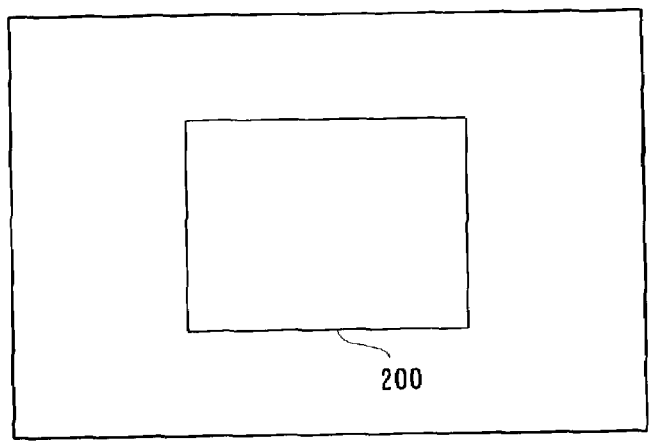
(A)
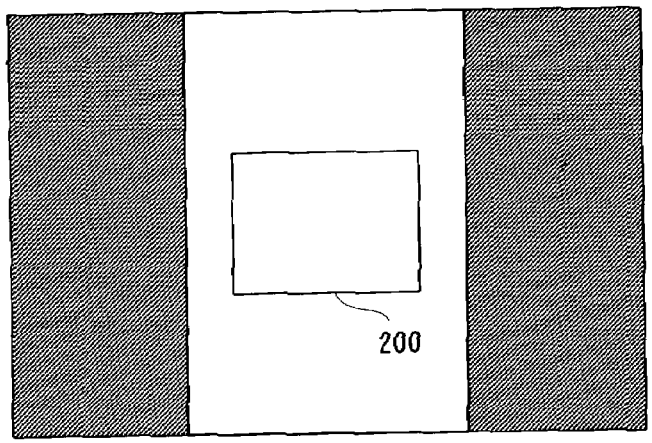
(B)
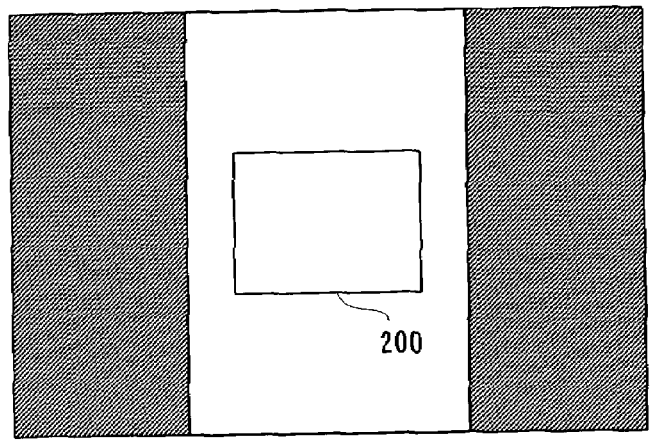
(C)

DIGITAL CAMERA HAVING INCLINATION SENSOR

BACKGROUND OF THE INVENTION

1. Field of the Invention

The present invention relates to a digital camera having an inclination sensor detecting an inclination in a rotating direction around an optical axis. More specifically, the present invention relates to a digital camera recording onto a recording medium an image photographed in response to a photographing instruction and a detection result of the inclination sensor at a time of accepting the photographing instruction, and displaying an image reproduced from the recording medium in a manner corresponding to the detection result of the inclination sensor relating to the reproduced image.

2. Description of the Prior Art

One example of conventional such a kind of digital camera is disclosed in a Japanese Patent Laying-open No. 1-130675 laid-open on May 23, 1989. In the prior art, a position (posture) of the camera at a time of photographing is detected by a camera position detective circuit, and camera position information is recorded together with a photographed image. In reproducing, a display manner of a display screen is switched on the basis of the camera position information. Thus, it is possible to continually control an orientation of the screen in a normal state without bothering a user.

Although the camera position detective circuit can detect an inclination of a rotating direction around an optical axis (right and left direction) and an inclination of a rotating direction around an axis (back and forth direction) perpendicular to a side surface of the camera, when inclination information in the back and forth direction is valid, inclination information in the right and left direction is invalid. This is because in a case of photographing an object on a table from directly above, there is no reference of an inclination to the right and left directions. Thereupon, when reproducing a photographed image of the object on the table, the object is displayed in a lateral direction irrespective of an intention to display it in a longitudinal direction or in a longitudinal direction irrespective of an intention to display it in a lateral direction.

SUMMARY OF THE INVENTION

Therefore, it is a primary object of the present invention to provide a novel digital camera.

It is another object of the present invention to provide a digital camera capable of displaying a reproduced image in a manner intended by an operator.

It is the other object of the present invention to provide an image processing method of a novel digital camera.

It is a further object of the present invention to provide an image processing method of a digital camera capable of displaying a reproduced image in a manner intended by an operator.

A digital camera according to this invention comprises: an inclination sensor for detecting an inclination in a rotating direction around an optical axis; a recorder for recording onto a recording medium an image photographed in response to a photographing instruction and a detection result of the inclination sensor at a time of accepting the photographing instruction; a first displayer for displaying an image reproduced from the recording medium in a manner corresponding to the detection result of the inclination sensor relating to the reproduced image; and an outputter for outputting on the basis of the detection result of the inclination sensor display manner information indicating how an image photographed in a current posture is displayed at a time of reproducing.

The display manner information output from the outputter reflects the current inclination of the digital camera in the rotating direction around the optical axis. The display manner information can be continued to be output even if the digital camera is inclined in a rotating direction around an axis perpendicular to a side surface of the digital camera. Thus, even when photographing with the digital camera directed upward or downward, it is possible to grasp the display manner at a time of reproducing from the display manner information. That is, it is possible to display the reproduced image in a manner intended by the operator utilizing the display manner information.

Preferably, when an acceptor accepts a photographing condition adjusting instruction prior to the photographing instruction, a photographing condition is adjusted by an adjuster. A fetcher fetches the detection result of the inclination sensor after the photographing condition is adjusted, and the outputter generates the display manner information on the basis of the detection result. Thus, the display manner information is output when the photographing condition instruction is accepted, i.e., when the operator needs.

In a case of displaying a real-time motion image of an object, the outputter preferably multiplexes the display manner information into the real-time motion image.

According to the present invention, an image processing method of a digital camera provided with an inclination sensor for detecting an inclination in a rotating direction around an optical axis comprises steps of: (a) outputting on the basis of a detection result of the inclination sensor display manner information indicating how an image photographed in a current posture is displayed at a time of reproducing; (b) recording onto a recording medium an image photographed in response to a photographing instruction and a detection result of the inclination sensor at a time of accepting the photographing instruction; and (c) displaying an image reproduced from the recording medium in a manner corresponding to the detection result of the inclination sensor relating to the reproduced image.

The display manner information output in the step (a) reflects the current inclination of the digital camera in a rotating direction around an optical axis. The display manner information is continues to be output even when the digital camera is inclined to a rotating direction around an axis perpendicular to the side surface of the digital camera. Therefore, even when photographing with the digital camera directed upward or downward, it is possible to grasp the display manner at a time of reproducing from the display manner information. That is, it is possible to display the reproduced image in a manner intended by the operator by use of the display manner information.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2(A) is a section view showing one example of an inclination sensor;

FIG. 2(B) is a perspective view of the inclination sensor shown in FIG. 2(A);

FIG. 4(A) is an illustrative view showing one example of a monitor display at a time of capturing the object shown in FIG. 3 in an erect state;

FIG. 4(B) is an illustrative view showing one example of a monitor display at a time of capturing the object shown in FIG. 3 in a 90 degrees inclined state to the right;

FIG. 4(C) is an illustrative view showing one example of a monitor display at a time of capturing the object shown in FIG. 3 in a 90 degrees inclined state to the left;

FIG. 5(A) is an illustrative view showing one example of a monitor display when the camera is displaced downward from the erect state;

FIG. 5(B) is an illustrative view showing one example of a monitor display when the camera is displaced downward from the 90 degrees inclined state to the right;

FIG. 5(C) is an illustrative view showing one example of a monitor display when the camera is displaced downward from the 90 degrees inclined state to the left;

FIG. 6(A) is an illustrative view showing a reproduced image of the object photographed in a state shown in FIG. 4(A);

FIG. 6(B) is an illustrative view showing a reproduced image of the object photographed in a state shown in FIG. 4(B);

FIG. 6(C) is an illustrative view showing a reproduce image of the object photographed in a state shown in FIG. 4(C);

FIG. 7(A) is an illustrative view showing a reproduced image of the object photographed in a state shown in FIG. 5(A);

FIG. 7(B) is an illustrative view showing a reproduced image of the object photographed in a state shown in FIG. 5(B);

FIG. 7(C) is an illustrative view showing a reproduced image of the object photographed in a state shown in FIG. 5(C);

DETAILED DESCRIPTION OF THE PREFERRED EMBODIMENTS

Figure 1:
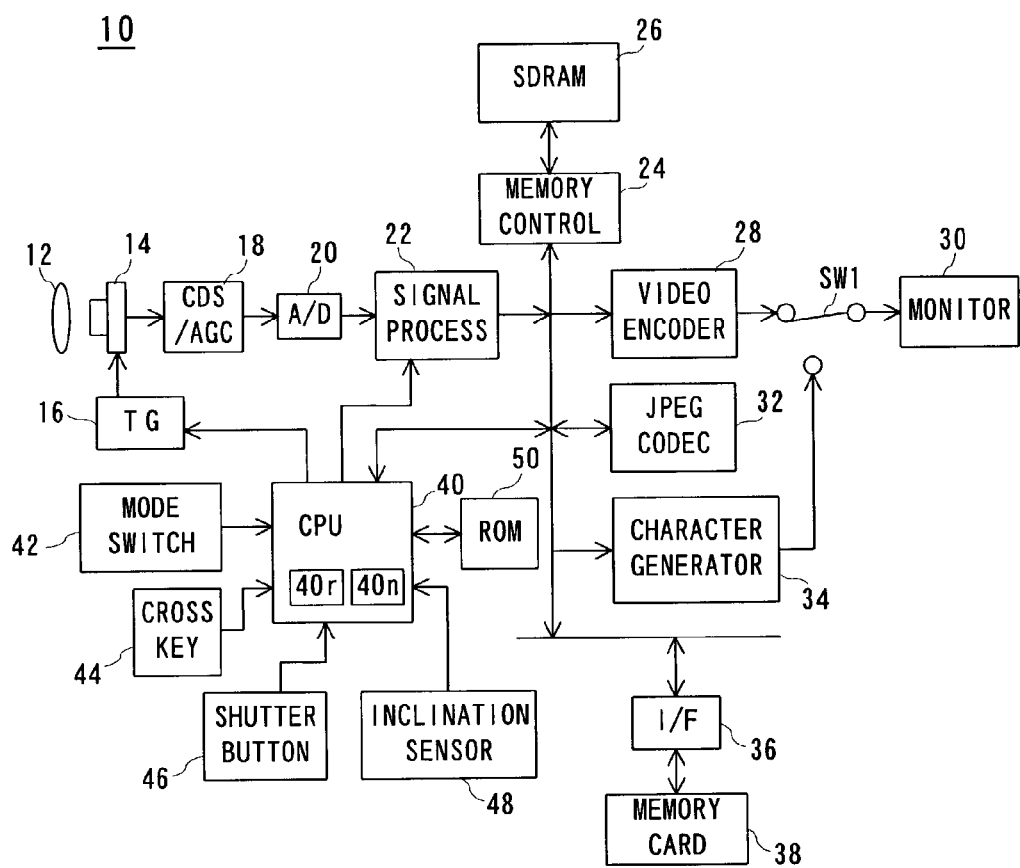
FIG. 1 is a block diagram showing one embodiment of the present invention.

Referring to FIG. 1, a digital camera 10 in this embodiment includes a focus lens 12. An optical image of an object is irradiated into a light-receiving surface of an image sensor 14 through the focus lens 12. A camera signal corresponding to the irradiated optical image, i.e., a raw image signal is generated by a photoelectronic conversion at the light-receiving surface. It is noted that the light-receiving surface is covered with a color filter (not shown) of a primary color Bayer array, and each of pixel signals forming the camera signal has any one of color components of R, G and B only.

When a camera mode is selected by a mode change switch 42, a CPU 40 executes a through image process. First, a TG (Timing Generator) 16 acquires a processing instruction, and the image sensor 14 is driven by the TG 16. The image sensor 14 reads out the camera signal generated by the photoelectronic conversion at a predetermined frame rate. The camera signal of each frame output from the image sensor 14 is subjected to well-known noise removal and level adjustment in a CDS/AGC circuit 18, and then converted to a digital signal in an A/D converter 20.

A signal processing circuit 22 performs color separation, white balance adjustment, YUV conversion and etc. on camera data of each frame output from the A/D converter 20 in response to a processing instruction from the CPU 40 and generates image data including a luminance component, that is, Y data and color difference components, that is, U data and V data. The generated image data is applied to a memory control circuit 24 so as to be written to an SDRAM 26 by the memory control circuit 24.

A video encoder 28 makes the memory control circuit 24 read the image data in the SDRAM 26 in response to a processing instruction from the CPU 40. Then, the read image data of each frame is encoded to a composite image signal in an NTSC format, and the encoded composite image signal is applied to a monitor 30 through a switch SW1. On the monitor 30, a real-time motion image of the object, i.e., a through image is displayed.

When a shutter button 46 is half-depressed by an operator, the CPU 40 adjusts a photographing condition such as an exposure amount, white balance and etc. After completion of adjusting the photographing condition, the CPU 40 fetches a 2 bits of detection result from an inclination sensor 48. In a state that the digital camera 10 is directed parallel with earth, and an inclination of the digital camera 10 in a rotating direction around an optical axis is 0 degree, i.e., in an erect state, the detection result indicates "11". In a state that the digital camera 10 is directed parallel with the earth and inclined 90 degrees in a clockwise direction around the optical axis, i.e., in a 90 degrees inclined state to the right, the detection result indicates "01". In a state that the digital camera 10 is directed parallel with the earth and inclined 90 degrees in a counterclockwise direction around the optical axis, i.e., in a 90 degrees inclined state to the left, the detection result indicates "10".

The CPU 40 instructs a character generator 34 to output a character signal corresponding to the detection result of the inclination sensor 48. The character generator 34 outputs the character signal in response to the instruction, and the output character signal is applied to the monitor 30 through the switch SW1. Therefore, a character corresponding to the detection result of the inclination sensor 48 is displayed on the monitor 30.

Figure 3:
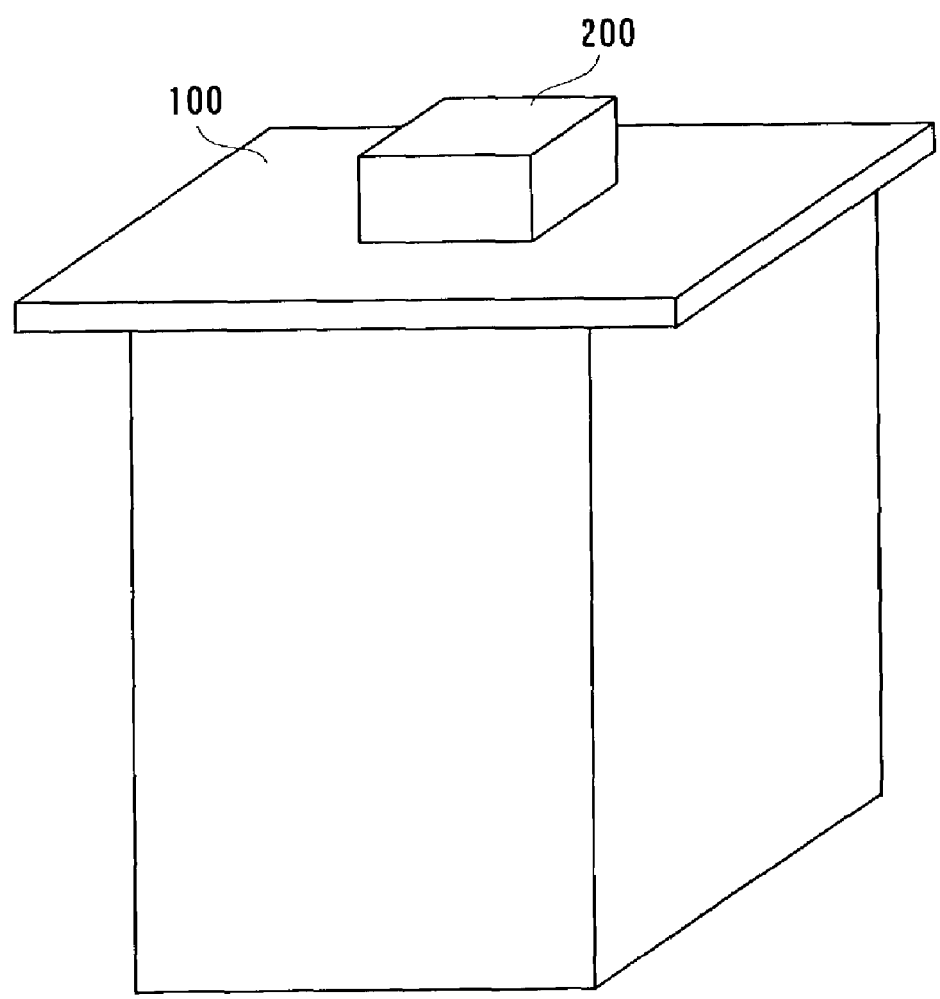
FIG. 3 is a perspective view showing one example of an object.

For example, when an object 200 put on a table 100 as shown in FIG. 3 is caught in the erect state and the shutter button 46 is half-depressed, an image shown in FIG. 4(A) is displayed on the monitor 30. According to FIG. 4(A), a through image of the table 100 and the object 200 is displayed on the screen, and a character C3 is displayed at the upper left of the screen. When the digital camera 10 is moved from this state to direct above of the object 200 and directed downward, a screen display is renewed to FIG. 5(A). According to FIG. 5(A), an upper surface of the object 200 is displayed on the screen 30, and the character C3 remains to be displayed at the upper left of the screen. The character C3 indicates that an image photographed in the current state by full-depressing the shutter button 46 is reproduced in the same manner.

When the table 100 and the object 200 shown in FIG. 3 is caught in the 90 degrees inclined state to the right, and the shutter button 46 is half-depressed, an image shown in FIG. 4 (B) is displayed on the monitor 30. According to FIG. 4 (B), the through image of the table 100 and the object 200 is displayed on the screen, and a character C1 is displayed at the upper right of the screen. When the digital camera 10 is moved from this state to direct above of the object 200 and directed downward, the screen display is renewed to FIG. 5 (B). According to FIG. 5 (B), the upper surface of the object 200 is displayed on the monitor 30 and the character C1 remains to be displayed at the upper right of the screen. The character C1 indicates that the image photographed in the current state by full-depressing the shutter button 46 is reproduced in a rotated state to the right by 90 degrees in an erect state of the digital camera 10 in a reproduction mode.

When the table 100 and the object 200 shown in FIG. 3 is caught in the 90 degrees inclined state to the left and the shutter button 46 is half-depressed, an image shown in FIG. 4 (C) is displayed on the monitor 30. According to FIG. 4 (C), the through image of the table 100 and the object 200 is displayed on the screen, and a character C2 is displayed at the lower left of the screen. When the digital camera 10 is moved from this state to direct above of the object 200 and directed downward, the screen display is renewed to FIG. 5 (C). According to FIG. 5(C), the upper surface of the object 200 is displayed on the monitor 30, and the character C2 remains to be displayed at the lower left of the screen. The character C2 indicates that the image photographed in the current state by frill-depressing the shutter button 46 is reproduced in a rotated state to the left by 90 degrees in the erect state of the digital camera 10 in a reproduction mode.

That is, the character C1, C2 or C3 displayed on the monitor 30 in an OSD manner is display manner information indicating how the image photographed in the current posture of the digital camera 10 is displayed in reproducing.

When the shutter button 46 is full-depressed, the CPU 40 performs a photographing/recording process. First, the CPU 40 instructs the TG 16 to read a camera signal. The TG 16 exposes the image sensor 14 in an electronic shutter scheme and reads a camera signal thus generated from the image sensor 14. The read camera signal is subjected to the above-described process and then converted to the image data including the luminance component and the color difference components, and the converted image data is stored in the SDRAM 26.

When the image data on the basis of the full depressing of the shutter button 46 is held in the SDRAM 26, the CPU 40 disables the TG 16 and applies a compression instruction to a JPEG codec 32. The JPEG codec 32 makes the memory control circuit 24 read the image data stored in the SDRAM 26, and performs a compression process complying with JPEG format on the read image data. When compressed image data, i.e., JPEG data is obtained, the JPEG codec 32 applies the JPEG data to the memory control circuit 24. The JPEG data is stored in the SDRAM 26 by the memory control circuit 24.

Thereafter, the CPU 40 reads the JPEG data from the SDRAM 26 through the memory control circuit 24 and records the read JPEG data onto a memory card 38 through an I/F circuit 36. The CPU 40 records onto the memory card 38 detection result information indicative of the detection result of the inclination sensor 48 just before the shutter button is full-depressed through the I/F circuit 36. When the detection result of the inclination sensor 48 indicates "01", that is, the 90 degrees inclined state to the right, the detection result information indicates "θ1". When the detection result of the inclination sensor 48 indicates "10", that is, the 90 degrees inclined state to the left, the detection result information indicates "θ2". When the detection result of the inclination sensor 48 indicates "11", that is, the erect state, the detection result information indicates "θ3". In recording onto the memory card 38, the JPEG data and the detection result information which are related with each other are stored in the same image file. Specifically, the JPEG data is stored onto the memory card 38 in a file format, and the detection result information is embedded in the image file.

The memory card 38 is an attachable/detachable nonvolatile storage medium and becomes accessible by the CPU 40 when loaded into a slot (not shown).

When a reproduction mode is selected by the mode change switch 42, the CPU 40 reads the JPEG data from the image file recorded onto the memory card 38 and writes the read JPEG data to the SDRAM 26 through the memory control circuit 24. The CPU 40 succeedingly applies an expansion instruction to the JPEG codec 32. The JPEG codec 32 reads the JPEG data from the SDRAM 26 through the memory control circuit 24 and performs an expansion process complying with the JPEG format on the read JPEG data. The expanded image data is applied to the memory control circuit 24.

The CPU 40 reads the detection result information from the image file from which the JPEG data has been read and instructs the memory control circuit 24 to write the expanded image data in a manner corresponding to the detection result information. Specifically, where the detection result information is "θ1", the CPU 40 takes the expanded image data as image data photographed in the 90 degrees inclined state to the right and instructs the memory control circuit 24 to write it in a rotated state to the right by the 90 degrees. Furthermore, where the detection result information is "θ2", the CPU 40 takes the expanded image data as image data photographed in the 90 degrees inclined state to the left and instructs the memory control circuit 24 to write it in a rotated state to the left by 90 degrees. Where the detection result is "θ3", the CPU 40 takes the expanded image data as image data photographed in the erect state and instructs the memory control circuit 24 to write it in the erect state.

The expanded image data developed in the SDRAM 26 is read through the memory control circuit 24 by the video encoder 28 and converted into a composite image signal in the NTSC format. The converted composite image signal is applied to the monitor 30 through the switch SW1, and consequently, a reproduced image is displayed.

In a case the shutter button 46 is full-depressed in a display state shown in FIG. 4(A) or FIG. 5(A), the detection result information embedded in the image file indicates "θ3". Thus, the image data read from the image file and expanded is developed in the erect state in the SDRAM 26. The reproduced image is displayed on the monitor 30 as shown in FIG. 6(A) or FIG. 7(A).

In a case the shutter button 46 is full-depressed in a display state shown in FIG. 4 (B) or FIG. 5 (B), the detection result information embedded in the image file indicates "θ1". Thus, the image data read from the image file and expanded is developed in the 90 degrees inclined state to the right in the SDRAM 26. The reproduced image is displayed on the monitor 30 as shown in FIG. 6 (B) or FIG. 7 (B).

In a case the shutter button 46 is full-depressed in a display state shown in FIG. 4 (C) or FIG. 5 (C), the detection result information embedded in the image file indicates "θ2". Thus, the image data read from the image file and expanded is developed in the 90 degrees inclined state to the left in the SDRAM 26. The reproduced image is displayed on the monitor 30 as shown in FIG. 6 (C) or FIG. 7 (C).

The inclination sensor 48 is specifically structured as shown in FIG. 2(A) and FIG. 2(B). A plate-type magnet 48*d* is embedded in a bottom portion of a case 48*h*, and a path 48*f* extending oblique upper to the right and to the left is formed inside the case 48*h*, rendering the embedded portion as a bottom portion. A ball-type magnet 48g is housed inside the path 48f. A hole element 48a and a plate-type magnet 48c are embedded in one end of a lengthwise direction of the path 48f while a hole element 48b and a plate-type magnet 48e are embedded in an other end of the lengthwise direction of the path 48f. An output terminal T1 is correspondent to the hole element 48a, and an output terminal T2 is correspondent to the hole element 48b. When the digital camera 10 is in the erect state, the inclination sensor 48 is also in the erect state. Furthermore, when the digital camera 10 is in the 90 degrees inclined state to the right, the inclination sensor 48 is also in the 90 degrees inclined state to the right. When the digital camera 10 is in the 90 degrees inclined state to the left, the inclination sensor 48 is also in the 90 degrees inclined state to the left.

When in the erect state, the magnet 48g is held at the bottom position by the magnet 48d. Herein, a magnetic field of the magnet 48c exerts an influence upon both of the hole elements 48a and 48b, and outputs of both of the output terminals T1 and T2 become "1". That is, the detection result of the inclination sensor 48 indicates "11".

When in the 90 degrees inclined state to the right, gravity of the magnet 48g exceeds holding power of the magnet 48d, and the magnet 48g moves to the other end of the lengthwise direction of the path 48f. The magnet 48g moved to the other end of the lengthwise direction is held by the magnet 48e. Herein, the hole element 48b is influenced by the magnet 48g while the hole element 48a is not influenced by the magnet 48g. Accordingly, the output of the output terminal T1 becomes "0", and the output of the output terminal T2 becomes "1". That is, the detection result of the inclination sensor 48 becomes "01". It is noted that when it is returned from the 90 degrees inclined state to the right to the erect state, the gravity of the magnet 48g exceeds the holding power of the magnet 48e, and the magnet 48g is returned to the bottom position.

When in the 90 degrees inclined state to the left, the magnet 48g moves to the one end of the lengthwise direction of the path 48f and is held by the magnet 48c. Herein, only the hole element 48a is influenced by the magnet 48g, and the outputs of the output terminals T1 and T2 become "1" and "0", respectively. That is, the detection result of the inclination sensor 48 becomes "10". It is noted that when it is returned from the 90 degrees inclined state to the left to the erect state, the gravity of the magnet 48g exceeds the holding power of the magnet 48c, and the magnet 48g is returned to the bottom position.

Even if the digital camera 10 is displaced downward from the erect state, the magnet 48g remains to exist at the bottom position by the holding power of the magnet 48d, and the detection result retains "11". Furthermore, when the digital camera 10 is displaced downward from the 90 degrees inclined state to the right, the magnet 48g remains to exist at the other end of the lengthwise direction by the holding power of the magnet 48e, and the detection result retains "01". Also, when the digital camera 10 is displaced downward from the 90 degrees inclined state to the left, the magnet 48g remains to exist at the one end of the lengthwise direction by the holding power of the magnet 48c, and the detection result retains "10".

Figure 8:
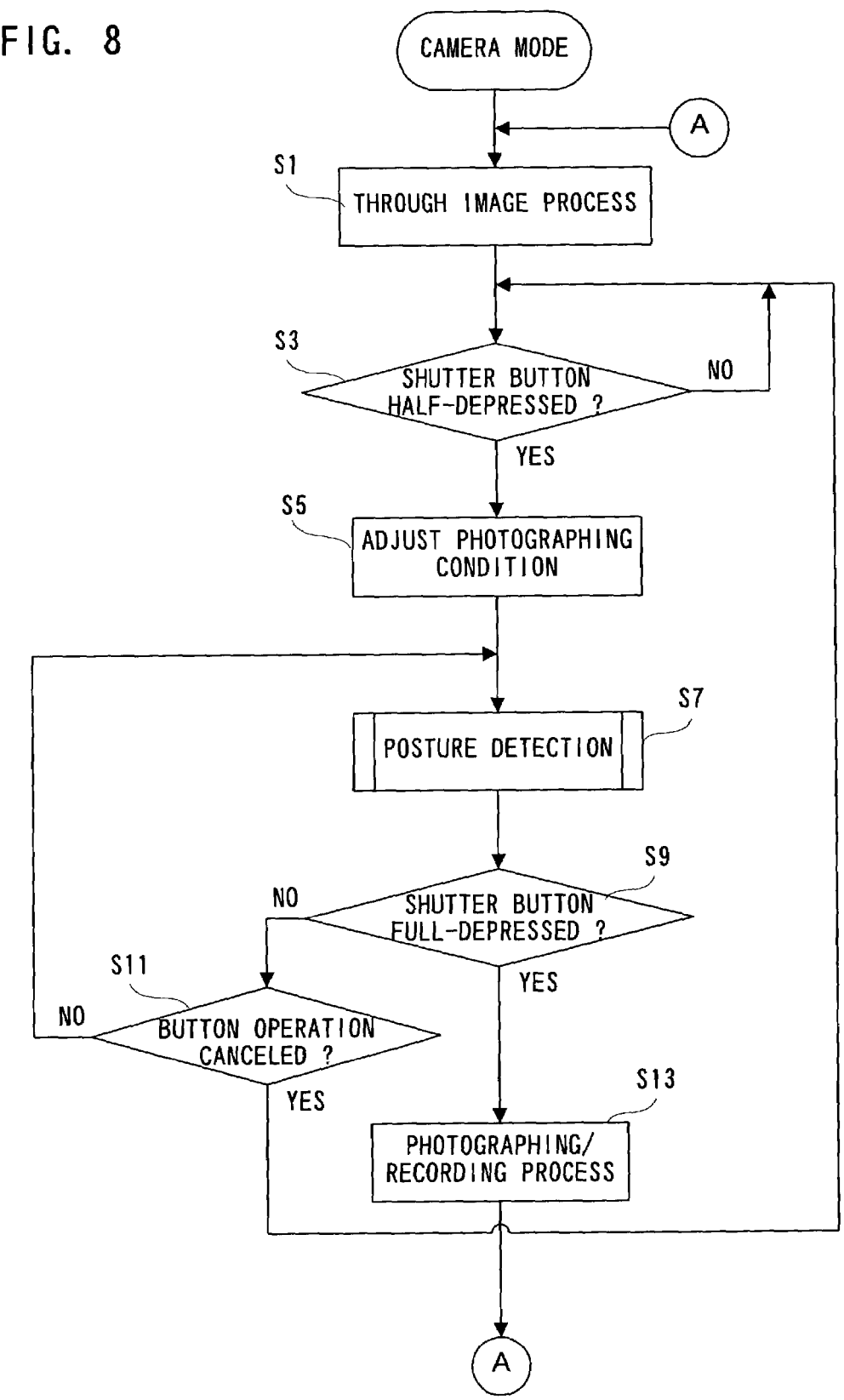
FIG. 8 is a flowchart showing a part of an operation of a CPU in a camera mode.
Figure 9:
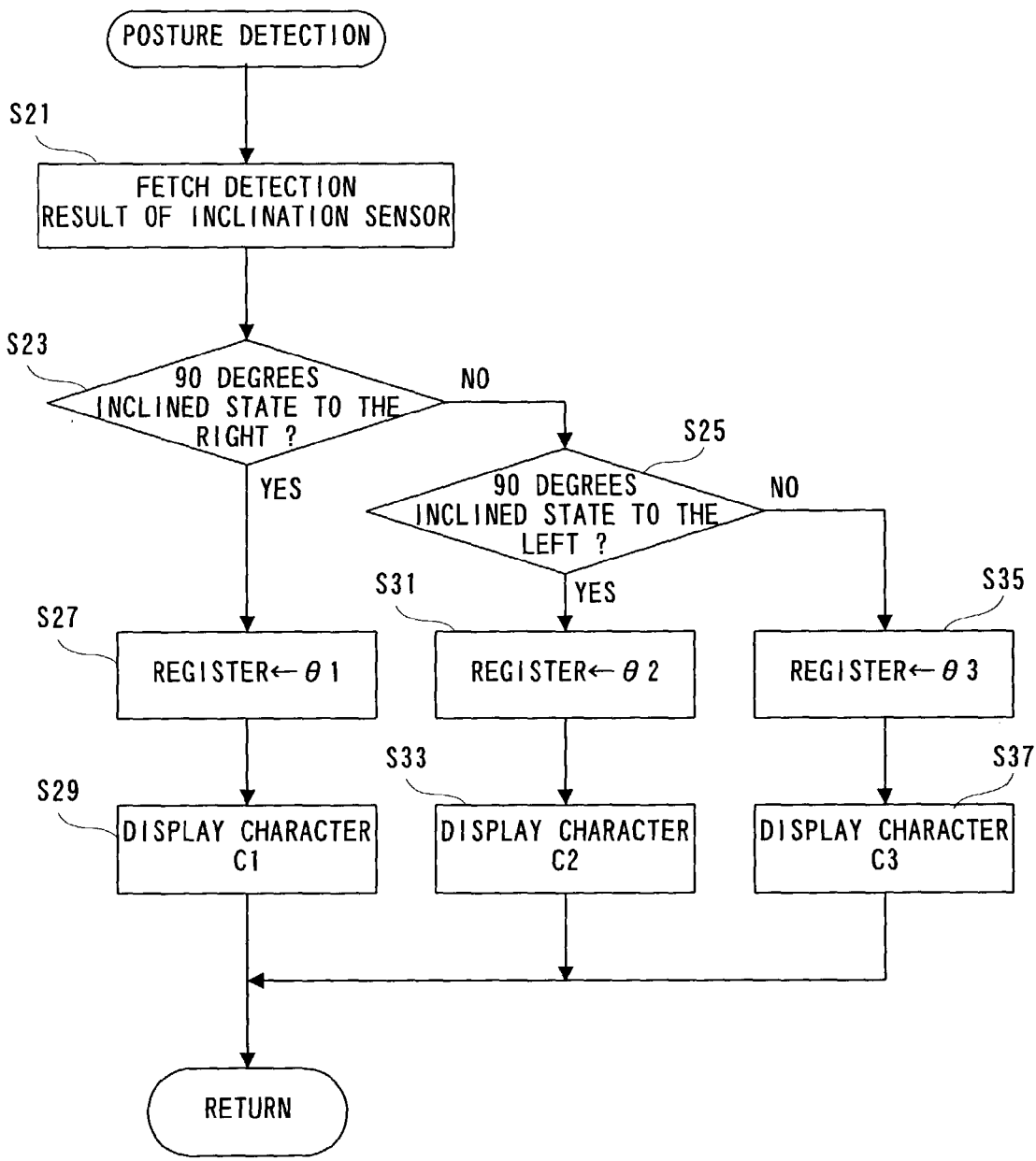
FIG. 9 is a flowchart showing another part of the operation of the CPU in the camera mode.

The CPU 40 processes flowcharts shown in FIG. 8 and FIG. 9 when the camera mode is selected. It is noted that a control program corresponding to the flowcharts is memorized in a ROM 50.

First, the through image process is performed in a step S1 shown in FIG. 8, whereby the through image is displayed on the monitor 30. It is determined whether or not the shutter button 46 is half-depressed in a step S3, and if "YES" is determined, the photographing condition such as the exposure amount, the white balance and etc. is adjusted in a step S5, and a posture detection of the digital camera 10 is performed in a step S7. After completion of the posture detection, an operation state of the shutter button 46 is determined in steps S9 and S11. If the depression of the shutter button 46 is canceled, "YES" is determined in the step S11, and the process returns to the step S3.

When the half-depressing state is continued, "NO" is determined in the step S11, and the process in the step S7 is repeated. When the shutter button 46 is full-depressed, a photographing/recording process is performed in a step S13. The JPEG data corresponding to the object image at a time of the full depressing of the shutter button 46 is recorded onto the memory card 38 in a file format by the photographing/recording process. At this time, the detection result information indicative of the detection result of the inclination sensor 48 just before the full depressing of the shutter button 46 is read from a register 40r described later, and the read detection result information is stored in the same image file.

The posture detection in the step S7 is executed according to a subroutine shown in FIG. 9. The detection result is fetched from the inclination sensor 48 in a step S21, and the posture of the digital camera 10 is determined on the basis of the detection result in steps S23 and S25. If the detection result is "01", it is determined to be the 90 degrees inclined state to the right, and the process proceeds from the step S23 to a step S27. The detection result information θ1 is set in the register 40r in the step S27, and the character C1 is displayed in the OSD manner on the monitor 30 by controlling the character generator 34 in a following step S29.

If the detection result fetched from the inclination sensor 48 is "10", it is determined to be the 90 degrees inclined state to the left, and the process proceeds from the step S25 to a step S31. The detection result information θ2 is set in the register 40r in the step S31, and the character C2 is displayed in the OSD manner on the monitor 30 in a following step S33. If the detection result fetched from the inclination sensor 48 is "11", it is determined to be the erect state, and the process proceeds from the step S25 to a step S35. The detection result information θ3 is set in the register 40r in the step S35, and the character C3 is displayed in the OSD manner on the monitor 30 in a following step S37. After completion of process of the step S29, S33 or S37, the process is restored to a hierarchical upper level of a routine.

Figure 10:
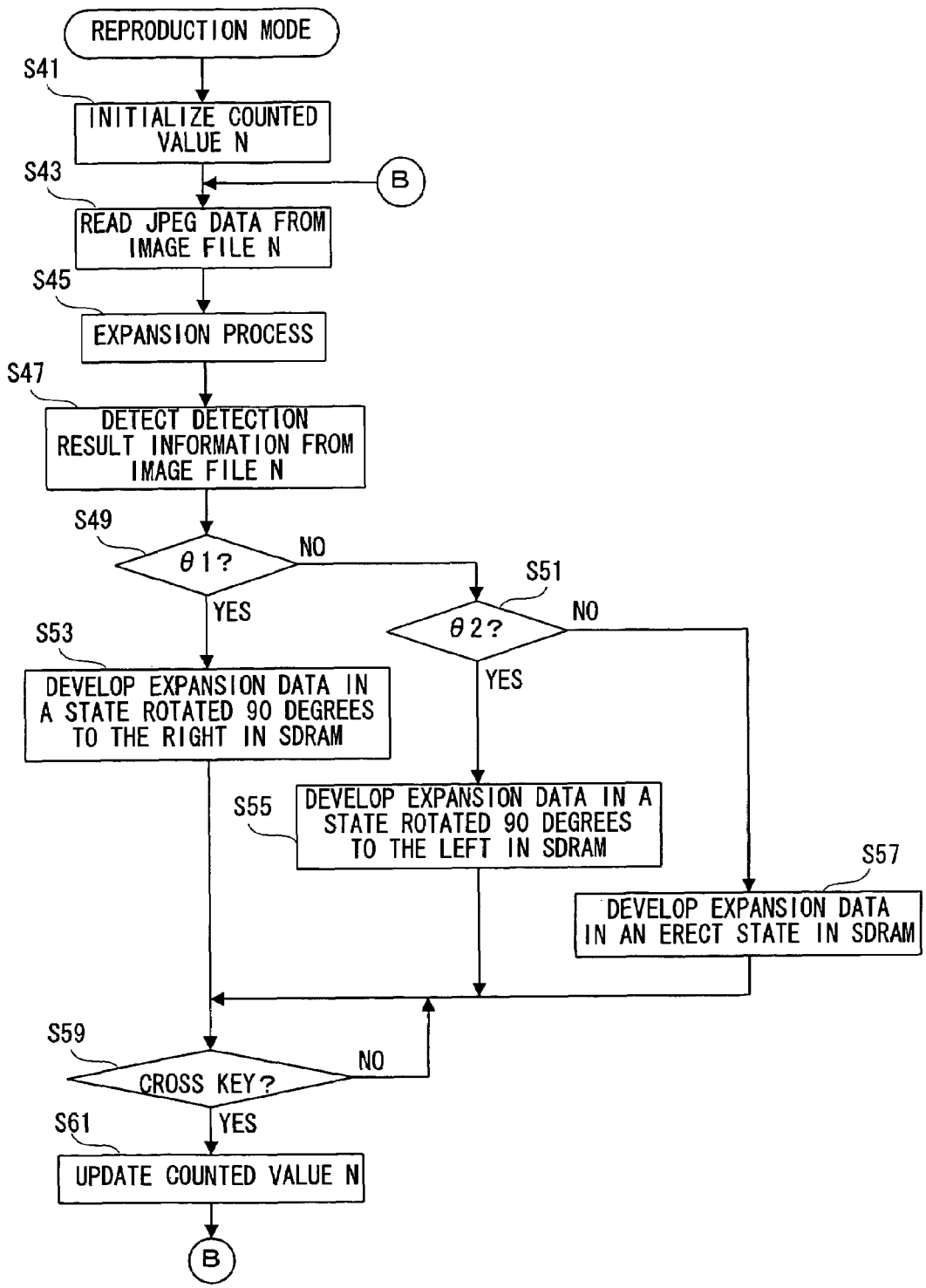
FIG. 10 is a flowchart showing a part of an operation of the CPU in a reproduction mode.

The CPU 40 processes a flowchart shown in FIG. 10 when the reproduction mode is selected. A control program corresponding to this flowchart is also memorized in the ROM 50.

First, a count value N of a counter 40n is initialized in a step S41. Next, the CPU 40 reads the JPEG data from the image file N so as to store in the SDRAM 26 in a step S43, and applies the expansion instruction to the JPEG codec 32 in a step S45. The JPEG data is applied from the SDRAM 26 to the JPEG codec 32 so as to be subjected to the expansion process.

The detection result information is read from the image file N in a step S47, and a content of the read detection result information is determined in following steps 549 and S51. If the detection result information is θ1 (=the 90 degrees inclined state to the right), the process proceeds from the step S49 to a step 553 so as to instruct the memory control circuit 24 to write the expanded image data to the SDRAM 26 in the state rotated 90 degrees to the right. If the detection result information is θ2 (=the 90 degrees inclined state to the left), the process proceeds from the step S51 to a step S55 so as to instruct the memory control circuit 24 to write the expanded image data to the SDRAM 26 in the state rotated 90 degrees to the left. If the detection result information is θ3 (=the erect state), the process proceeds from the step S51 to a step S57 so as to instruct the memory control circuit 24 to write the expanded image data to the SDRAM 26 in the erect state.

The expanded image data is written to the SDRAM 26 in a desired state by the memory control circuit 24. The expanded image data is read by the video encoder 28 and therefore, the reproduced image is displayed on the monitor 30 in the desired state. After completion of process of the step S53, S55 or S57, it is determined whether or not a cross key 44 is operated in a step S59, and if "YES" is determined, the counter 40n is renewed in a step S61 and then, the process returns to the step S43. Thus, the reproduced image is renewed.

As can be understood from the above description, the inclination sensor 48 detects the inclination of the digital camera 10 in a rotating direction around the optical axis. When the shutter button 46 is half-depressed in the camera mode, the character signal corresponding to the detection result of the inclination sensor 48 is generated by the character generator 34, and the character based on the character signal is displayed on the monitor 30. The character is the display manner information indicating how the image photographed in the current posture is displayed at a time of reproducing.

When the shutter button 46 is full-depressed, the image photographed in response to the full depressing and the detection result information of the inclination sensor 48 at a time of the full depressing are stored onto the memory card 38. In the reproduction mode, an image reproduced from the memory card 38 is displayed in a manner corresponding to the detection result information of this image.

The character displayed in response to the half depressing of the shutter button 46 indicates how an image photographed in a current camera posture is displayed at a time of reproducing. The character is also displayed when the digital camera 10 is inclined in a rotating direction around an axis perpendicular to the side surface of the digital camera 10. Thus, even when photographing with the digital camera 10 directed upward or downward, it is possible to grasp the display manner at a time of reproducing from the character. In other words, by performing the photographing by use of the character, it is possible to display the reproduced image in a manner intended by the operator.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:
   an inclination sensor for detecting an inclination in a rotating direction around an optical axis;
   a recorder for recording onto a recording medium an image photographed in response to a photographing instruction and a detection result of said inclination sensor at a time of accepting the photographing instruction;
   a first displayer for displaying an image reproduced from said recording medium in a manner corresponding to the detection result of said inclination sensor relating to the reproduced image; and
   an outputter for outputting display manner information on the basis of the detection result of said inclination sensor, the display manner information being output prior to reproducing an image and indicating how an image to be photographed in a current posture of the digital camera will be displayed at a time of reproducing.

2. A digital camera according to claim 1, further comprising:
   an acceptor for accepting a photographing condition adjusting instruction prior to the photographing instruction;
   an adjuster for adjusting the photographing condition in response to the photographing condition adjusting instruction; and
   a fetcher for fetching the detection result of said inclination sensor after the photographing condition is adjusted, wherein said outputter generates the display manner information on the basis of the detection result of said inclination sensor fetched by said fetcher.

3. A digital camera according to claim 1, further comprising a second displayer for displaying a real-time motion image of an object, wherein said outputter multiplexes the display manner information into the real-time motion image.

4. An image processing method of a digital camera provided with an inclination sensor for detecting an inclination in a rotating direction around an optical axis, comprising steps of:
   (a) outputting display manner information on the basis of a detection result of said inclination sensor, the display manner information being output prior to reproducing an image and indicating how an image to be photographed in a current posture of the camera will be displayed at a time of reproducing;
   (b) recording onto a recording medium an image photographed in response to a photographing instruction and a detection result of said inclination sensor at a time of accepting the photographing instruction; and
   (c) displaying an image reproduced from said recording medium in a manner corresponding to the detection result of said inclination sensor relating to the reproduced image.

5. An image processing method according to claim 4, further comprising steps of:
   (d) accepting a photographing condition adjusting instruction prior to said step (a);
   (e) adjusting a photographing condition in response to the photographing condition adjusting instruction; and
   (f) fetching a detection result of said inclination sensor after the photographing condition is adjusted, wherein said step (a) includes a step of (a-1) generating the display manner information on the basis of the detection result of said inclination sensor fetched in said step (f).

6. An image processing method according to claim 4, further comprising a step of (g) displaying a real-time motion image of an object prior to said step (b), wherein said step (a) includes a step of (a-2) multiplexing the display manner information into the real-time motion image.

7. A digital camera, comprising:
   an inclination sensor for detecting an inclination in a rotating direction around an optical axis;
   a recorder for recording onto a recording medium in a camera mode an image photographed in response to a photographing instruction and detection result information indicative of a detection result of said inclination sensor at a time of accepting the photographing instruction;

a generator for generating display manner information based on the detection result of said inclination sensor in the camera mode, the display manner information indicating how an image photographed in a current posture is displayed at a time of reproducing from said recording medium;

an information outputter for outputting the display manner information generated by said generator toward an operator who issues the photographing instruction; and a first displayer for displaying in a reproduction mode an image reproduced from said recording medium in a manner corresponding to the detection result information relating to the reproduced image, wherein said inclination sensor includes a case having a tubular space which extends in a direction perpendicular to the optical axis, a movable body having a volume smaller than a volume of the space so as to be accommodated in the space and moving in a direction perpendicular to the optical axis, a holder for magnetically holding said movable body at any one of a plurality of positions in the space, and an outputter for generating an output which is different depending upon a position of said movable body.

8. A digital camera according to claim 7, further comprising:
   an acceptor for accepting a photographing condition adjusting instruction prior to the photographing instruction in the camera mode;
   an adjuster for adjusting the photographing condition in response to the photographing condition adjusting instruction accepted by said acceptor; and
   a fetcher for fetching the detection result of said inclination sensor after the photographing condition is adjusted by said adjuster, wherein said generator generates the display manner information based on the detection result of said inclination sensor fetched by said fetcher.

9. A digital camera according to claim 8, further comprising a second displayer for displaying a realtime motion image of an object in the camera mode wherein said information outputter multiplexes the display manner information into the real-time motion image.

10. A digital camera according to claim 7, further comprising a second displayer for displaying a real-time motion image of an object in the camera mode, wherein said information outputter multiplexes the display manner information into the real-time motion image.

* * * * *